United States Patent
Davis et al.

(10) Patent No.: US 9,436,698 B2
(45) Date of Patent: Sep. 6, 2016

(54) SHARING A FILE SYSTEM BETWEEN MULTIPLE OPERATING SYSTEMS

(71) Applicant: LENOVO (Singapore) PTE, LTD., New Tech Park (SG)

(72) Inventors: Mark Charles Davis, Durham, NC (US); Scott Edwards Kelso, Cary, NC (US); Howard Locker, Cary, NC (US); Steven Richard Perrin, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 169 days.

(21) Appl. No.: 14/179,364

(22) Filed: Feb. 12, 2014

(65) Prior Publication Data

US 2015/0227547 A1   Aug. 13, 2015

(51) Int. Cl.
*G06F 3/00*     (2006.01)
*G06F 17/30*   (2006.01)

(52) U.S. Cl.
CPC ... *G06F 17/30168* (2013.01); *G06F 17/30126* (2013.01); *G06F 17/30182* (2013.01)

(58) Field of Classification Search
CPC . G06F 9/4418; G06F 1/3203; G06F 9/45558
See application file for complete search history.

(56) References Cited

U.S. PATENT DOCUMENTS

| | | | | |
|---|---|---|---|---|
| 2004/0098473 | A1* | 5/2004 | Yodaiken | G06F 9/45537 709/223 |
| 2005/0172294 | A1* | 8/2005 | Kanemura | G06F 9/441 718/107 |
| 2007/0005661 | A1* | 1/2007 | Yang | G06F 17/30168 |
| 2009/0245485 | A1* | 10/2009 | Locker | H04M 1/64 379/88.22 |
| 2012/0079458 | A1* | 3/2012 | Williams | G06F 9/30189 717/124 |
| 2013/0061237 | A1* | 3/2013 | Zaarur | G06F 9/4856 718/105 |
| 2014/0032601 | A1* | 1/2014 | Kanigicherla | G06F 17/30194 707/781 |
| 2015/0180985 | A1* | 6/2015 | Seibert | H04L 67/143 709/206 |

* cited by examiner

*Primary Examiner* — Omar Abdul-Ali
(74) *Attorney, Agent, or Firm* — Kunzler Law Group (57) ABSTRACT

For sharing a file system between multiple operating systems, a method is disclosed that includes sharing a file system between two or more operating systems, the two distinct operating systems concurrently operating on a computing device, determining, by a processor, that one of the two or more operating systems has an altered need for the file system, and changing interfaces to the file system based on the altered need.

21 Claims, 10 Drawing Sheets

SHARING A FILE SYSTEM BETWEEN MULTIPLE OPERATING SYSTEMS

BACKGROUND

1. Field

The subject matter disclosed herein relates to computer file systems management and more particularly relates to sharing a file system between multiple operating systems.

2. Description of the Related Art

File systems for computing devices are used in virtually every industry. A computing device may directly access a file system using a local interface. The computing device may share the file system to many other computing devices through a network interface. A network interface to a file system may be slower than a local interface to the file system. Furthermore, computing devices accessing a file system through a network interface must rely on the operability of the serving computing device in order to access the file system.

BRIEF SUMMARY

An apparatus for sharing a file system between multiple operating systems is disclosed. The apparatus includes a processor and a memory that stores code executable by the processor. In one embodiment, the code determines an altered need for a file system that is shared on one of two or more operating systems concurrently operating on a computing device, and changes a local interface for the file system to one of the two or more operating systems based on the altered need. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
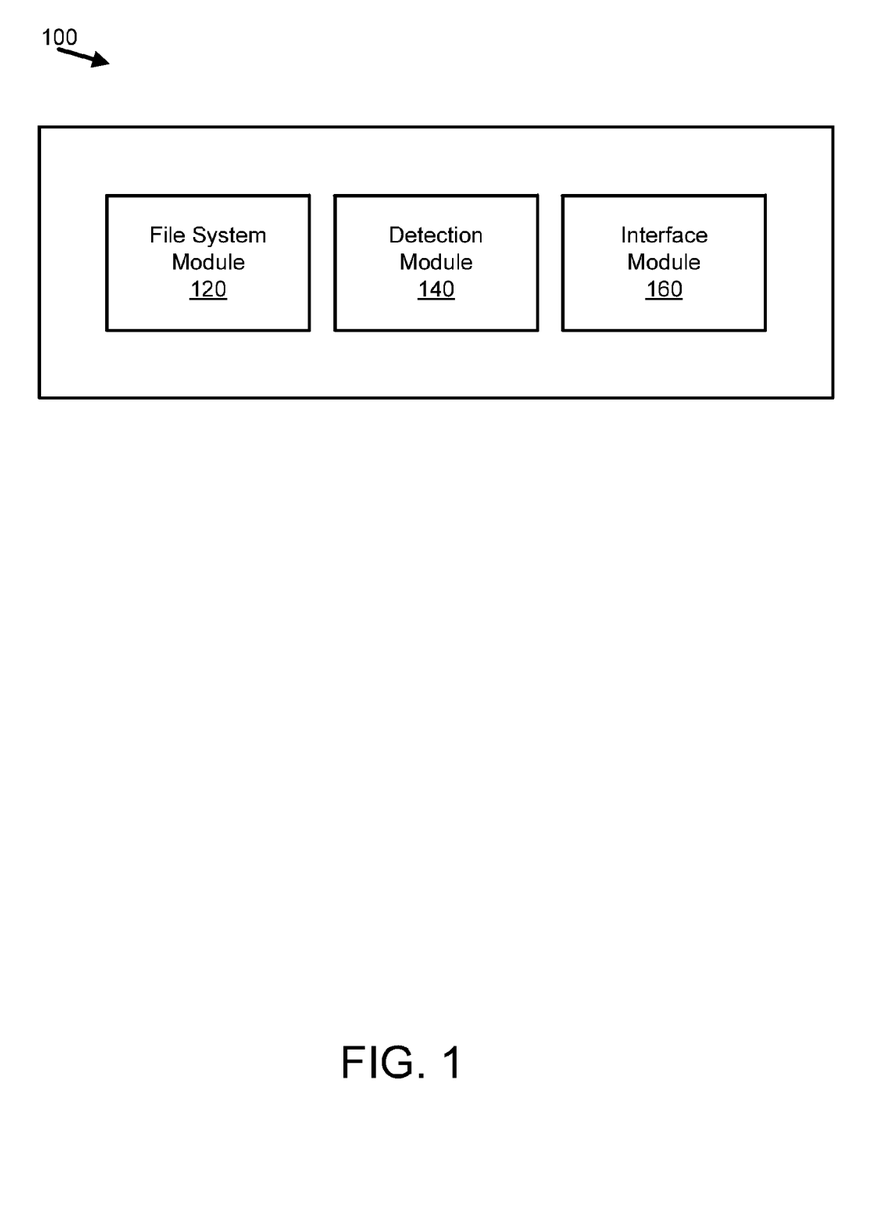
FIG. 1 is a schematic block diagram illustrating one embodiment of an apparatus for sharing a file system between multiple operating systems.

FIG. 1 is a schematic block diagram illustrating one embodiment of an apparatus for sharing a file system between multiple operating systems. In one embodiment, the apparatus includes a processor, a memory that stores code executable by the processor. In one embodiment, the code includes a file system module that shares a file system from a first operating system to a second operating system, the first and second operating systems operating concurrently on a computing device, a detection module that determines an altered need for the file system on the second operating system, and an interface module that changes a file system interface of the second operating system based on the altered need.

In one embodiment, two operating systems may concurrently operating on a computing device based on the two operating systems both being in an active power state. The two operating systems may have been booted, initialized, or the like. In another embodiment, one of the two operating systems may be in an active power state, and another of the two operating systems may have transitioned into a sleep mode state. Nevertheless, although one of the two operating systems may be sleeping, hibernating, suspended, or the like, because the operating system may have been booted or initialized the operating systems may be concurrently operating. In one example, an operating system may be sleeping, but waiting for a wake-up signal. Therefore, although an operating system may be in a sleep mode power state, it may still be operating.

In one embodiment, the apparatus includes a file system module 120. The file system module 120 may be configured to manage a file system. In one embodiment, the file system module 120 may provide a local interface to the file system to a computing device.

In another embodiment, the file system module 120 may be configured to provide a network interface to the file system. For example, the file system may be local to a first computing device, and the file system module 120 may share the local file system over a network to another computing device. Therefore, in certain embodiments, the file system may be accessed by a local computing device through a local interface, and many remote computing devices communicating through a network interface.

The file system may include a wide variety of different file system technologies, formats, structures, or the like. For example, the file system may include, but is not limited to, FAT, FAT12, FAT16, FAT32, exFAT, NTFS, HPS, HPS+, HPFS, UFS, ext2, ext3, ext4, XFS, btrfs, ISO 9660, Files-11, Veritas File System, VMFS, ZFS, ReiserFS, UDE, or other, or the like. The file system may be used to store computer readable information on a hard drive, a flash drive, a compact disc, a memory device, a RAM disk, or the like. On skilled in the art may recognize many other ways computer readable data may be stored on a storage medium and this disclosure is not limited in this regard.

In one example, a first operating system may communicate with the file system through a local interface. The first operating system may include a network server to make the file system available through a network interface. A second operating system may include a network client to access the file system through the network server interface. Therefore, in one example, the first operating system and the second operating system may concurrently communicate with the file system. In another embodiment, there may be many other operating systems that communicate with the file system through a network client.

In this example, one drawback is that the second operating systems must rely on the first operating system to access the file system. For example, if the first operating system because busy processing other tasks, the network access to the file system may slow down. In another example, if the first operating system powers down, the second operating system may no longer access the file system.

This drawback may be addressed by including a local interface to many operating systems. The operating systems would share the local interface as needed or as requested. For example, a first operating system may include a local interface to the file system, and a second operating system may include a network interface to the file system. The second operating system may request local access to the file system. The first operating system may shut down the network interface and relinquish control of the local interface. The second operating system may then acquire control of the local interface to perform tasks, or similar, or the like. Therefore, in certain embodiments, the file system module 120 may share a local interface to many operating systems based on requests from operating systems to access the file system.

In one embodiment, operating systems desiring to access the file system may include executable code to communicate locally with the file system. Furthermore, operating systems may also include executable code to communicate with the file system over a network connection. Because each operating system may be able to communicate with the file system either locally, or over a network, the file system module may be capable of switching interfaces from a network interface to a local interface, or from a local interface to a network interface.

In one example, a first operating system may include a local interface to the file system. The first operating system, in certain embodiment, may share the file system via network service. A second operating system may connected to the network service using a network client in order to communicate with the file system through a network interface.

In one example, the first operating system may request to be powered down. In response, the file system module 120 may indicate to the second operating system to close the network client, may indicate to the first operating system to close the network server, and may indicate to the first operating system to close the local interface to the local file system. Before closing the network client, the second operating system may complete pending operations and may sync with the file system. The second operating system may then initialize a local interface to the file system. In this way, a second operating system may still access the file system without requiring the first operating system.

In other embodiments, many other operating systems, or computing devices may have connected to the network service of the first operating system. The file system module 120 may indicate to all other operating systems to close their respective interfaces to the network share of the first operating system. In response to switching the local interface from the first operating system to the second operating system, the second operating system may also initiate a network service to share access to the file system. Furthermore, the file system module 120 may indicate to the other operating system to connect to the second operating system to restore their network connections to the file system.

Regarding a local interface to a file system, this disclosure is meant to include all ways or means to physically connect a computing device to a storage device. Connection technologies include, but are not limited to, bit serial interfaces and word serial interfaces. Bit serial interfaces may include ST506, ST412, Enhanced Small Disk Interface, Fibre Channel, Serial ATA (SATA), Serial Attached SCSI (SAS), or other, or the like. A SATA interface may use RS485, Local-Talk, USB, Firewire, differential SCSI, or the like. Of course, one skilled in the art may appreciate other ways to locally interface to a file system and this disclosure is not limited in this regard.

In one embodiment, a computing device may include a mechanical switch between the file system and two or more operating systems. The file system module 120 may switch the mechanical switch in order to disconnect one operating system from the local file system, and connect another operating system to the local file system. In one example, the mechanical switch may include one input port and two output ports. The file system module 120 may switch to connect one of the output ports to the input port. Of course, one skilled in the art may appreciate other ways to manipulate a local connection between multiple operating systems and this disclosure is not limited in this regard.

In another embodiment, a computing device may include other hardware switches connecting controllers for various operating systems in order to enable local access to the file system to one of the operating systems. In another embodiment, an operating system may communicate via a bus architecture that may allow one or more masters. For example, two operating systems may communicate via a bus architecture that physically connects the file system to two or more controllers. In this example, the file system module 120 may indicate which operating system may control the bus in order to access the file system locally. In this example, the indicated operating system may control the physical connection to the file system, while another operating system that communicate via the bus may access the file system through the operating system with the physical connection.

Regarding a network interface, this disclosure is meant to include all ways or means to connect a computing device to a file system over a network. For example, the Mac Operating System may share a file system using an Apple Filing Protocol. Transport protocols may include TCP, UDT, AppleTalk, or the like. In another example, a Unix like operating system may share a file system using a network file system (NFS). The transport protocol for NFS may include TCP or UDP. In another example, a Microsoft Operating System, such as Windows, may share a file system over SMB, or CIFS. A transport protocol for SMB or CIFS may include TCP, NBT, UDP, NBF, NetBIOS, or the like. In another example, a Novell Netware server may share a file system using NCP or SAP, using an SPX, or an IPX transport protocol. Of course, one skilled in the art may appreciate other ways to share a file system over a network and this disclosure is not limited in this regard. A file system module 120 may change, alter, adjust, terminate, stop, start, restart, or initiate network services on a computing device to share the file system to other computing devices on a network. A network may include a local area network, a wide area network, an Internet, or any other kind of network, or the like.

In one embodiment, the apparatus includes a detection module 140. The detection module 140. In one embodiment, the detection module may determine an altered need for the file system on one of the two or more operating systems.

In one embodiment, the detection module 140 may determine an altered need based on an operating system performing an increased number of operations on the file system. For example, an operating system may perform an increased number of write operations to the file system. In another example, an operating system may perform an increased number of read operations on the file system. Therefore, in certain embodiments, an operating system may request increased input or output to the file system and the detection module 140 may determine the altered need based on the increased input or output.

In another embodiment, the detection module 140 may determine an altered need based on an operating system sleeping, hibernating, powering down, or the like. In one example, an operating system may include a local interface to a file system and another operating system may communicate with the file system through a network interface. In response to the operating system powering down, the detection module 140 may determine that the other operating system still needs to access the file system. Because the file system will no longer be available after the serving operating system powers down, the detection module 140 may determine an altered need based on the other operating system needing another interface to the file system.

In certain embodiments, the detection module 140 may determine an altered need based on use of the file system exceeding a use threshold value. For example, a threshold value may include a Megabytes per second input or output to or from the file system. For example, a threshold value may be 5 megabytes, and the detection module 140 may determine that an altered need based on an operating system exceeding the threshold value for a threshold period of time. For example, if the operating system reads or writes to or from the file system at a rate that exceeds 5 megabytes per sec (the threshold value) for more than 5 seconds (the threshold period of time), the detection module 140 may determine an altered need. Of course one skilled in the art may recognize other threshold values based, at least in part, on historical use of the file system, capabilities of the file system, or the like.

In one embodiment, the apparatus includes an interface module 160 that changes a file system interface of an operating system based on the altered need. In one example, a first operating system may include a local interface and may share the file system to a second operating system over a network. In response to the detection module 140 determining an altered need for the file system, wherein the altered need includes the first operating system requesting a decreased number of operations for the file system and the second operating system requesting an increased number of operations for the file system, the interface module 160 may indicate to the file system module 120 to switch the interfaces.

For example, the file system module 120 may command the first operating system to close the network interfaces, and to close the local interface. The interface module 160 may then command the second operating system to initiate a local interface to the file system and then share the file system over a network. The interface module 160 may then command the first operating system to initiate a network connection to the share of the first operating system.

Therefore, in certain embodiments, the interface module 160 may switch a local interface to the file system to an operating system that requires more access, and switch a network interface to an operating system that requires less access to the file system. In another embodiment, the interface module 160 may move a local interface away from an operating system that requires minimal access to the file system.

In one example, less access may include a user editing a few documents via the operating system. In another example, minimal access may include a user not editing any files on the file system. In another example, minimal access may include a user browsing the Internet using the operating system. In these examples, the operating system may not write many files or read many files to the file system.

In another example, more access may include a user compiling an application on the operating system. Compiling an application on an operating system may read and write many files to the file system. In another example, more access may include copying a large directory of files from the file system, or copying a large directory of files to the file system. In another example, more access may include streaming a video from the file system. In another example, more access may include processing a database on the file system. Of course, one skilled in the art may recognize other scenarios where increased access to the file system may be requested.

Figure 2:
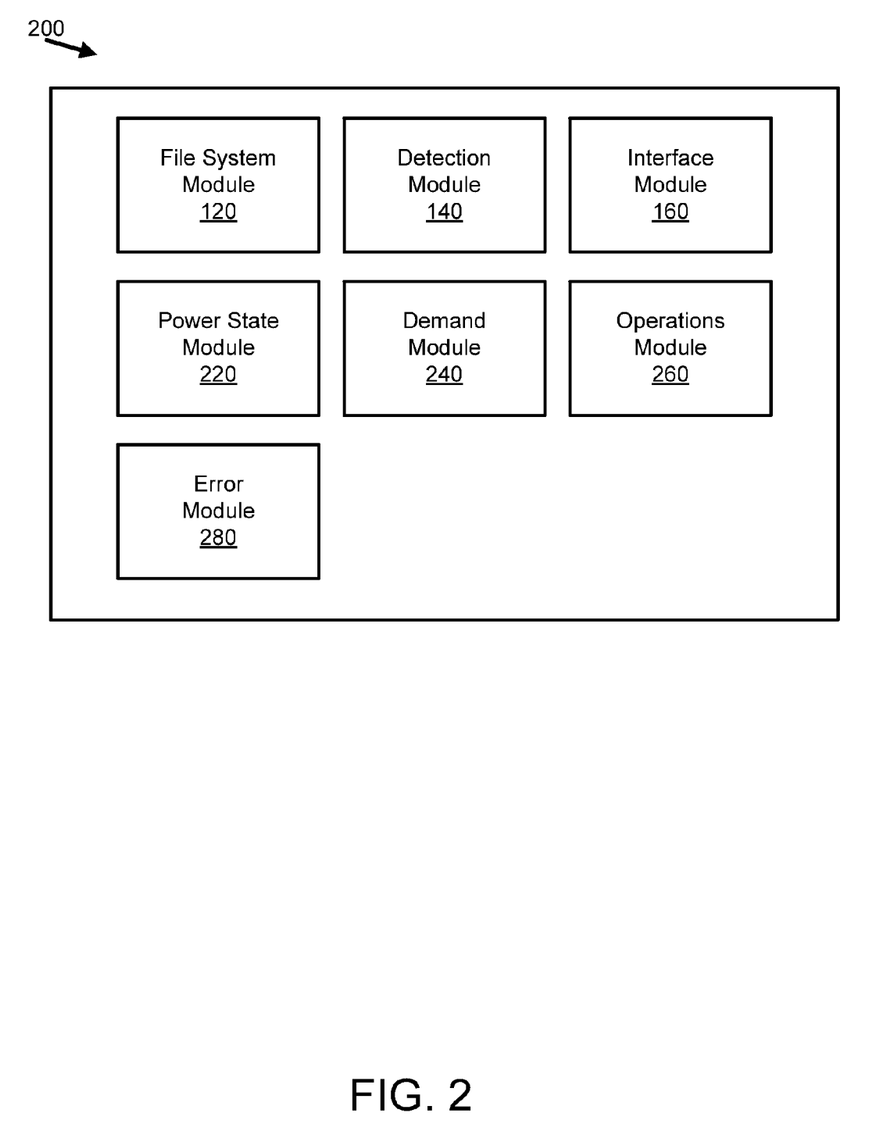
FIG. 2 is a schematic block diagram illustrating one embodiment of an apparatus for sharing a file system between multiple operating systems.

FIG. 2 is a schematic block diagram illustrating one embodiment of an apparatus 200 for sharing a file system between multiple operating systems. In one embodiment, the apparatus 200 may include the file system module 120, the detection module 140, the interface module 160, a power state module 220, a demand module 240, an operations module 260, and an error module 280.

In one embodiment, the apparatus includes the power state module 220 that monitors power states for one or more operating systems. In another embodiment, the detection module 140 may determining the altered need based on a power state change for an operating system.

A power state as described herein may include, but is not limited to, a computing device in a sleep mode, a computing device in a hibernation mode, a computing device in a suspended mode, a computing device being active, or the like. An active power state may include a computing device wherein the operating system may be currently executing executable code. A sleep mode power state may include a hibernation power state, a suspended power state, or other, or the like. In certain embodiments, a power state change may include a computing device transitioning from one power state to another power state. For example, a computing device may transition from an active power state to a sleep mode power state as one skilled in the art may appreciate.

In one embodiment, the power state module 220 may monitor power states of a computing device, or an operating system as previously described regarding the file system module 120. The power state module 220 may monitor power states such as, but not limited to, powering off, powering on, sleeping, hibernating, suspending, failing, losing power, failing to respond, or the like. A detection module 140 may determine a reduced need for a file system in response to an operating system powering down. A detection module may determine an increased need for the file system in response to an operating system powering up. A detection module 140 may determine a reduced need for a file system in response to an operating system going to sleep, hibernating, suspending, or the like.

In one embodiment, the apparatus 200 includes the demand module 240 that measures a demand for the file system, the detection module determining the altered need based on the demand. In one embodiment, the demand module 240 may determine an altered need for the file system based on an increase in read operations for the file system. For example, the demand module 240 may measure a data throughput through an interface for the file system. The data throughput may be based on read operations, write operations, or other operations. The demand module 240, in certain embodiments may notify the interface module 160 after measuring an altered demand for the file system.

In another embodiment, the demand module 240 may determine an altered need based on the operating system executing a high demand application. For example, a compiling application may demand significant file system resources. In another example, a movie processing application may require significant file system resources. In another example, a database application may demand significant file system resources because the database application may read and/or write to the file system more frequently than other applications. Of course, many other applications executable by an operating system may require significant file system resources as one skilled in the art may appreciate. The demand module 240 may determine an altered need for the file system in response to an application being executed on an operating system.

In one embodiment, the apparatus 200 includes the operations module 260 that suspends operations for the file system in response to the interface module changing the file system interface. In one example, the operations module 260 may suspend read operations, write operations, or other operations.

In one embodiment, the operations module 260 may execute operations in an operations queue, but may suspend operations not yet in the queue. In one embodiment, the operations module 260 may suspend operations while the interface module 160 is changing interfaces as previously described. The operations module 260 may resume operations for a file system after the interface module has changed operating system interfaces.

In certain embodiments, an application executing may experience delays in operations while an interface module 160 is changing interfaces. For example, an operating system may include a local interface to a file system. The interface module 260 may change interfaces as previously described, and the operations module 260 may suspend operations for the operating system, and therefore, the application. After the operations module 260 suspends operations, the operating system may close the local interface. After a different operating system initiates a local interface to the file system and shares the file system to the operating system, the operating system may initiate a network interface to the file system. After the operating system initiates a network interface to the file system, the operations module 260 may resume operations on the file system. In certain embodiments, the operating system may not detect a change in the interface to the file system from a local interface to a network interface.

In one embodiment, the apparatus 200 includes the error module 280 that monitors the first and second operating system for errors, the altered need based on the errors. In one embodiment, an operating system may enter an error state. For example, an error on an operating system may indicated a reduced demand for the operating system. For example, an error with an I/O controller for the operating system may cause the operating system to fail to communicate with a file system using a local interface. Therefore, the interface module 160 may change a local interface to a network interface based on errors. In another embodiment, the interface module 160 may select another operating system to initiate a local interface to the file system and to share the file system to other operating systems via a network connection.

In another embodiment, the error module 280 may monitor an operating system for network errors. In response to detecting network errors, the error module 280 may command the interface module 160 to change the network interface to a local interface.

Figure 3:
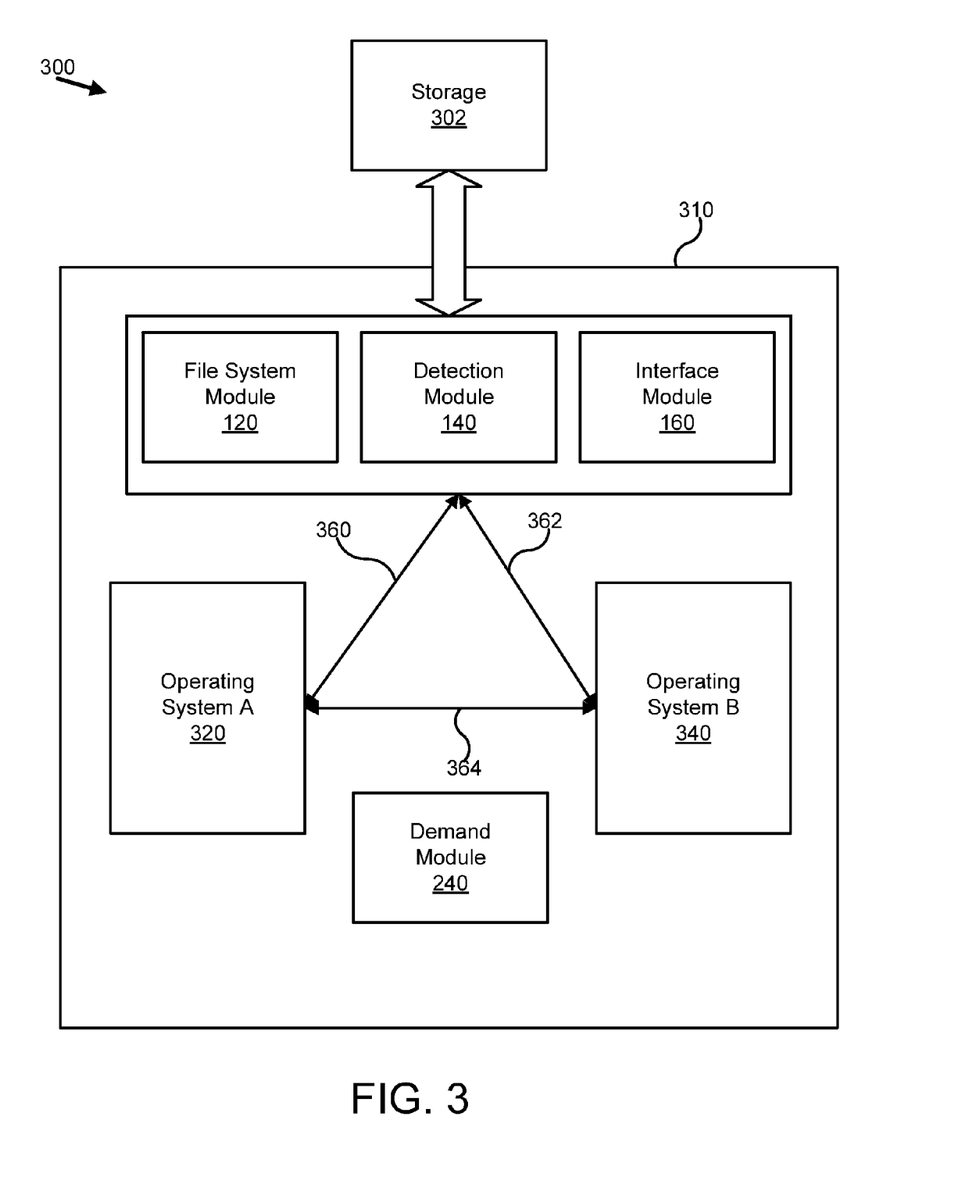
FIG. 3 is a schematic block diagram illustrating one embodiment of an apparatus for sharing a file system between multiple operating systems.

FIG. 3 is a schematic block diagram illustrating one embodiment of an apparatus for sharing a file system between multiple operating systems. In one embodiment, the apparatus 300 includes storage 302, the file system module 120, the detection module 140, the interface module 160, an operating system A 320, and an operating system B 340, and the demand module 240. The file system module 120 may manage a file system on the storage 302 as previously described. The storage 302 may be any storage type currently available or to be developed and this disclosure is not limited regarding the type of storage.

In one embodiment, the operating system A 320 may include a local interface 360 to the file system. In another embodiment, the operating system B 340 may include a local interface 362 to the file system. In certain embodiments, local interfaces 360,362 may be enabled or disabled. For example, in one scenario, operating system A may include the local interface 360 to the file system and share the file system over a network connection 364 as previously described. In this scenario, operating system A may communicate with the file system locally, and may share access to the file system to the operating system B 340 over the network connection 364.

The demand module 240 may measures a demand for the file system. In one embodiment, the demand module may measure a local demand by operating system A, and may measure a network demand for the file system by operating system B. The demand module 240 may determine a local demand for the file system by comparing network demand for the file system over the network interface 364 with local demand for the file system through the local interface 360. Network demand may be subtracted from local demand to determine a demand for the file system associated with operating system A 320.

Therefore, in one embodiment, the demand module 240 may compare demands for the file system between operating system A and operating system B. In response to operating system B demanding more from the file system than operating system A, the interface module 160 may switch interfaces as previously described. The interface module may disable the local interface 360 for operating system A, and may enable a local interface 362 for operating system B. Operating system B 340 may then share access to the file system to operating system A 320. In this way, both operating system A 320 and operating system B may access the file system however, the operating system 320,340 with the most demand will be granted a local interface. Therefore, the operating system 320,340 that requires more input or output to or from the file system will be provided a local interface to the file system, while the other operating system 320,340 will be provided a network interface to the file system. Of course, the demand module 240 may monitor a demand for more operating systems that may be operating on the computing device 310.

Figure 4:
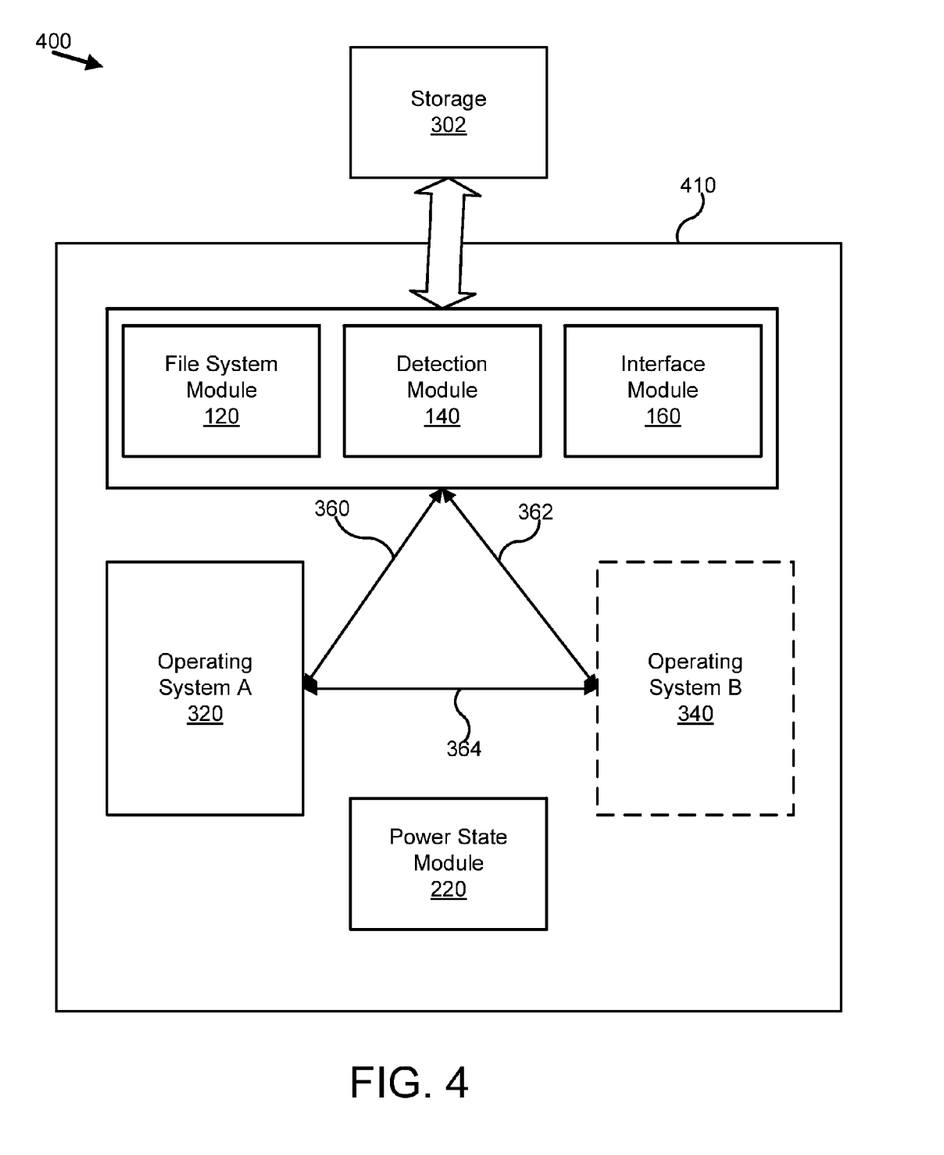
FIG. 4 is a schematic block diagram illustrating one embodiment of an apparatus for sharing a file system between multiple operating systems.

FIG. 4 is a schematic block diagram illustrating one embodiment 400 of an apparatus for sharing a file system between multiple operating systems 320,340. In one embodiment, the apparatus 400 includes storage 302, the file system module 120, the detection module 140, the interface module 160, an operating system A 320, an operating system B 340, and the power state module 220.

As previously described regarding the power state module 220, in certain embodiments, an operating system 340 may alter a state of power for the operating system 340. In one example, a user may power off the operating system 340. In response to being powered off, going to sleep, hibernating, or the like, the operating system 340 may notify the power state module 220 of an expected power state change. The power state module 220 may notify the detection module 140 of a needed change to the interfaces to the file system. This may ensure that an active operating system always includes the local interface to the file system.

In another example, the detection module 140 may detect an altered operating system 340 may be powered on by a user. In response to being powered on, or the detection module 140 detecting a new operating system 340, the detection module 140 may determine an altered need based on the power state module 220 detecting a new operating system. The interface module 160 may change a local interface to the new detected operating system 340.

In another example, the power state module 220 may notify the detection module 140 in response to the power state module 220 determining that an operating system 340 has lost power. Although a power state change may not have been expected, the power state module 220 may detect the change and notify the detection module 140.

Figure 5:
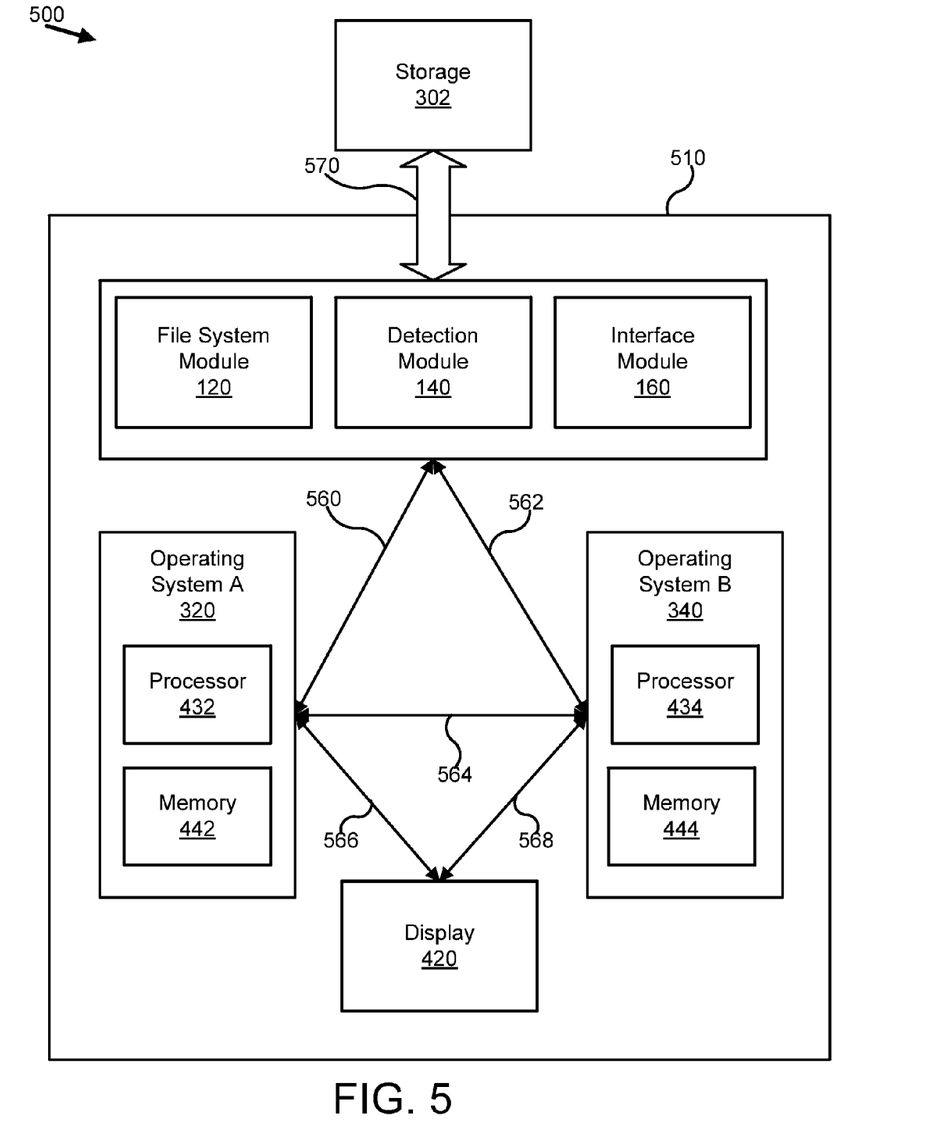
FIG. 5 is a schematic flow chart diagram illustrating one embodiment of an apparatus for sharing a file system between multiple operating systems.

FIG. 5 is a schematic flow chart diagram illustrating one embodiment of an apparatus for sharing a file system between multiple operating systems. In one embodiment, the apparatus 500 may include storage 302, a local interface to the storage 570, the file system module 120, the detection module 140, the interface module 160, an operating system A 320, an operating system B 340, and a display 420.

In certain embodiments, operating system A 320 may include an independent processor 432, and independent memory 442. The operating system B 340 may also include an independent processor 434, and independent memory 444. Independent processors, and independent memory may mean that the processors are not shared between operating systems 320,340.

The processors 432,434 may include any and all kinds of processors for executing operations on the computing device 400 as one skilled in the art may appreciate. Furthermore, the memory 442,444 may include any and all kinds of memory for storing data or information by the operating system 320,340. Therefore, this disclosure is not limited regarding the processors 432,434 and memory 442,444. Therefore, in certain embodiments, the operating system A 320, and the operating system B 340 may perform operations independently, may execute application independently, and may function independently regardless of which of the operating systems 320,340 includes a local interface to the file system.

In one embodiment, the operating system A 320 may include a local interface 560 to the file system. In another embodiment, the operating system B 340 may include a local interface 562 to the file system. In certain embodiments, local interfaces 560,562 may be enabled or disabled. For example, in one scenario, operating system A 320 may include the local interface 560 to the file system and share the file system over a network connection 564 as previously described. In this scenario, operating system A 320 may communicate with the file system locally, and may share access to the file system to the operating system B 340 over the network connection 564.

In another embodiment, the operating systems 320,340 may include independent interfaces 566,568 to a display 420. In one embodiment, the display 420 may be managed by the operating system 320,340 with a local interface to the file system. In another embodiment, the computing device 310 may include a switch for a user to switch the display between operating system A 320 and operating system B 340. Switching such a switch may enable or disable interfaces to the display 420. For example, switching to operating system A may enable display interface 566 and may disable interface 568. In another example, switching to operating system B 340 may enable display interface 568 and may disable display interface 566. Therefore, in one embodiment, the interface module 160 may change a local interface 570 to the file system 302 based on the operating system 320,340 that currently displays to the display 420.

Figure 6:
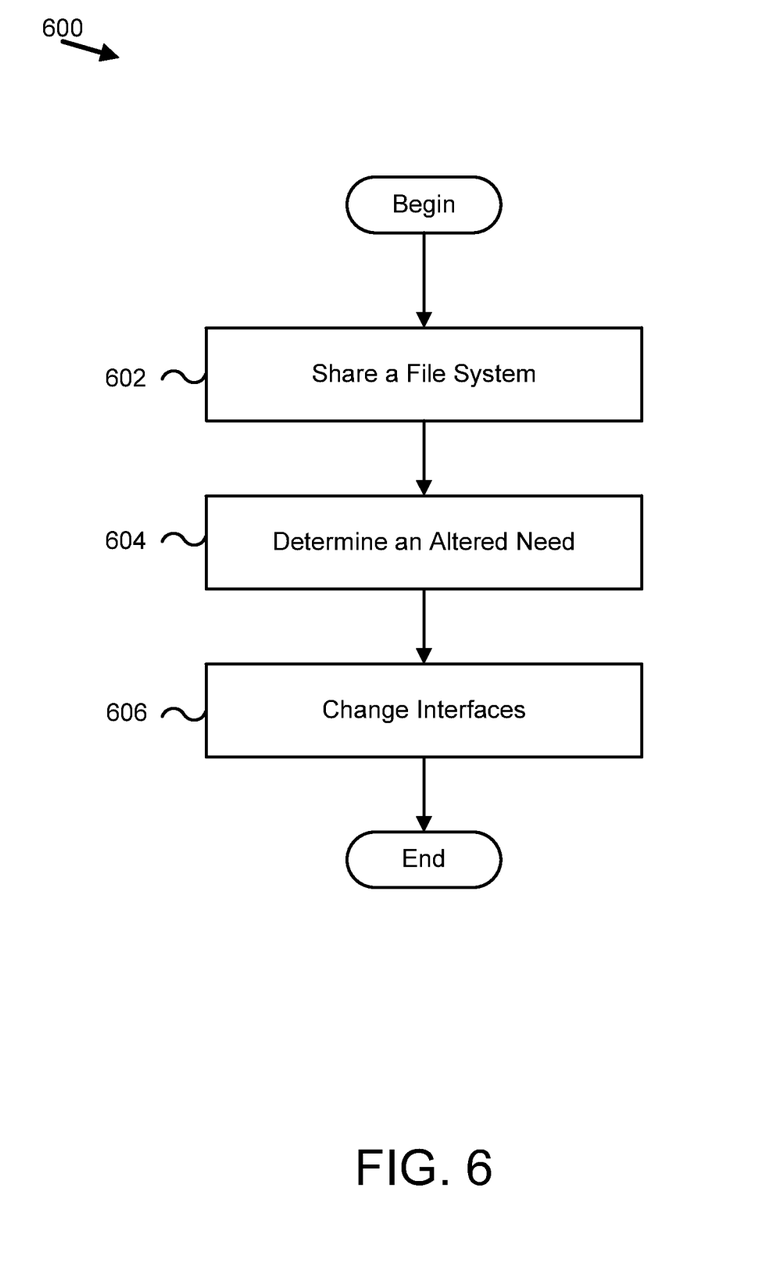
FIG. 6 is a schematic flow chart diagram illustrating one embodiment of a method for sharing a file system between multiple operating systems.

FIG. 6 is a schematic flow chart diagram illustrating one embodiment of a method 600 for sharing a file system between multiple operating systems. In one embodiment, the method may begin and a file system module 120 may share 602 a file system. A detection module 140 may determine 604 an altered need for the file system. An interface module 160 may change 606 interfaces to the file system based on the altered need and the method may end.

Figure 7:
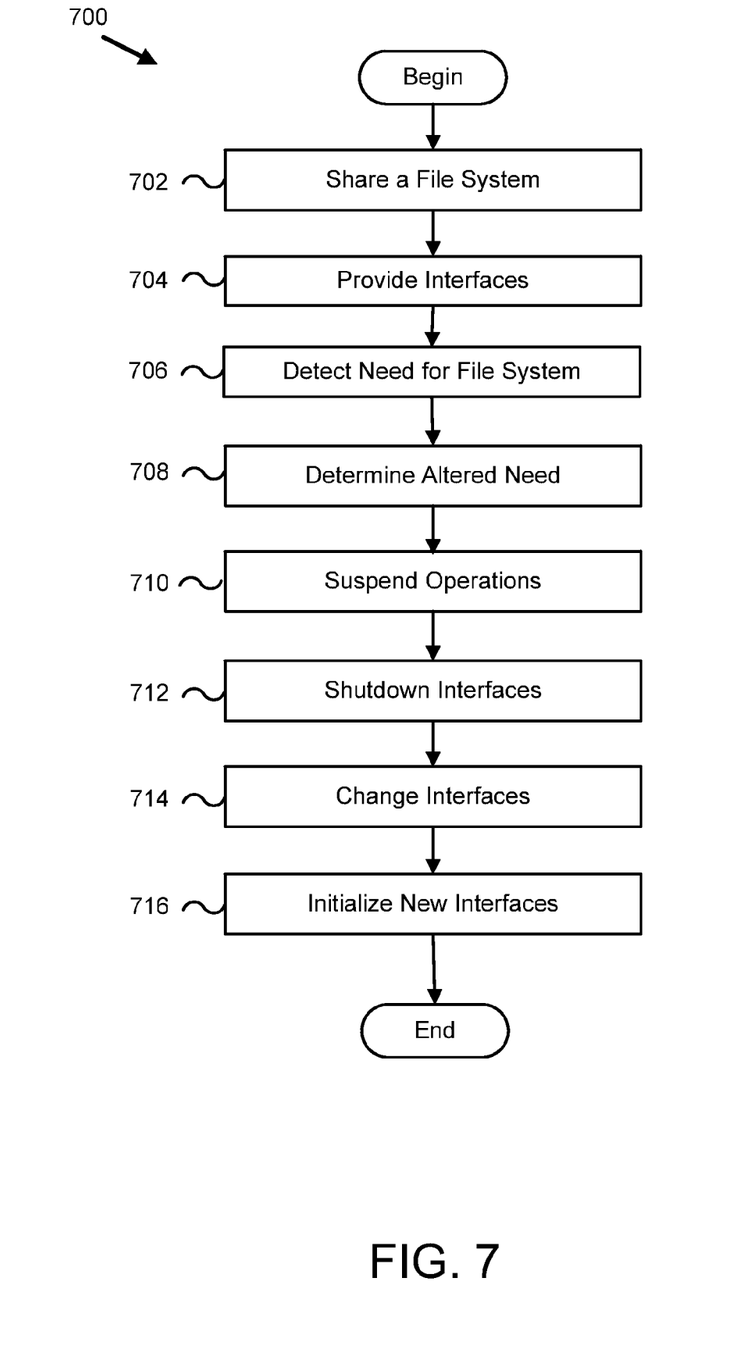
FIG. 7 is a schematic flow chart diagram illustrating one embodiment of a method for sharing a file system between multiple operating systems.

FIG. 7 is a schematic flow chart diagram illustrating one embodiment of a method 700 for sharing a file system between multiple operating systems. In one embodiment, the method 700 may begin and a file system module 120 may share 702 a file system. An operating system with a local interface to the file system may provide 704 an interface to another operating system. The detection module 140 may detect 706 a need for a local interface to the file system. The detection module 140 may determine 708 an altered need for the file system. An operations module 260 may suspend 710 operations for the file system. The interface module 160 may shutdown 712 interface to the file system. The interface module 160 may change 714 interface to the file system. The interface module 160 may initialize 716 new interfaces to the file system and the method may end.

In one example, initializing 716 new interfaces to the file system may include providing a local interface to the file system to an operating system, and command the operating system to share the file system to another operating system.

Figure 8:
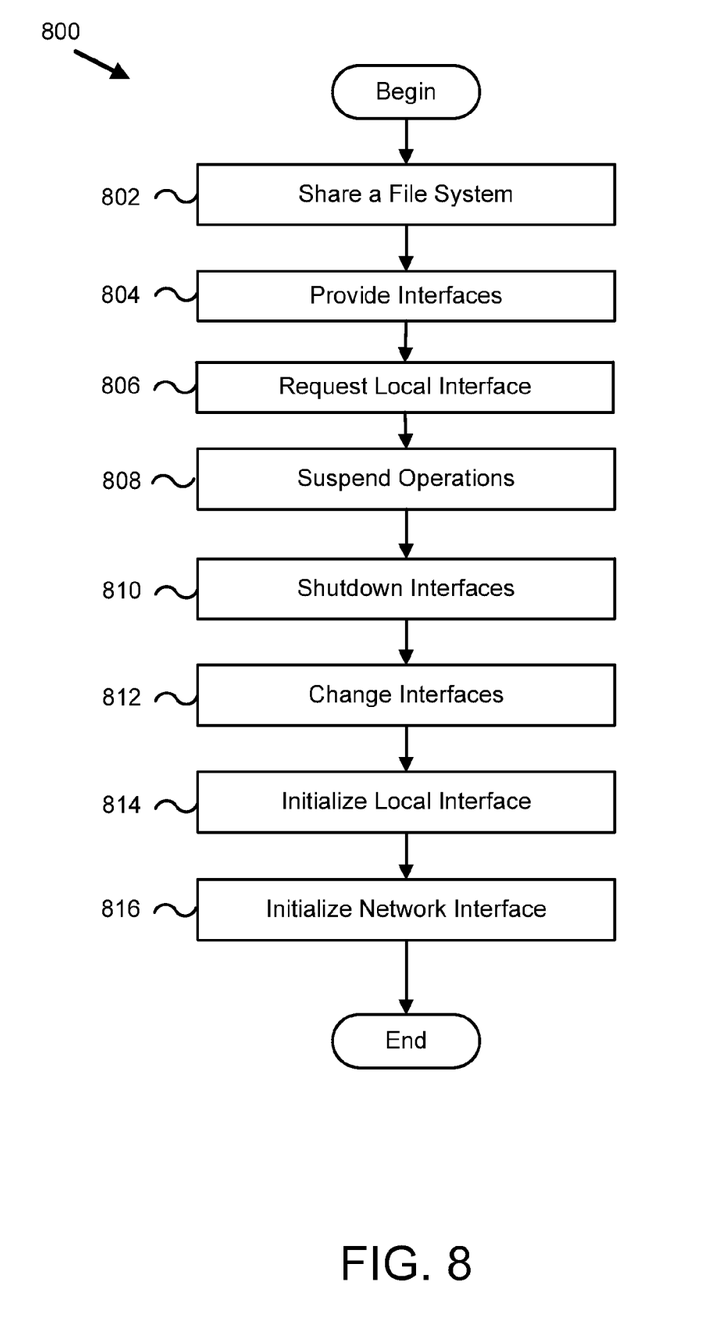
FIG. 8 is a schematic flow chart diagram illustrating one embodiment of a method for sharing a file system between multiple operating systems.

FIG. 8 is a schematic flow chart diagram illustrating one embodiment of a method 800 for sharing a file system between multiple operating systems. In one embodiment, the method 800 may begin and a file system module 120 may share 802 a file system. An interface module 160 may provide 804 interfaces to operating systems. An operating system may request 806 a local interface to the file system. The operations module 260 may suspend 808 operations on the file system. The interface module 160 may shutdown 810 interfaces to the file system. The interface module 160 may change 812 interfaces to the file system. The file system module 120 may initialize 814 a local interface to the file system. An operating system with a local interface to the file system may initialize 816 a network interface to the file system, and the method may end.

Figure 9:
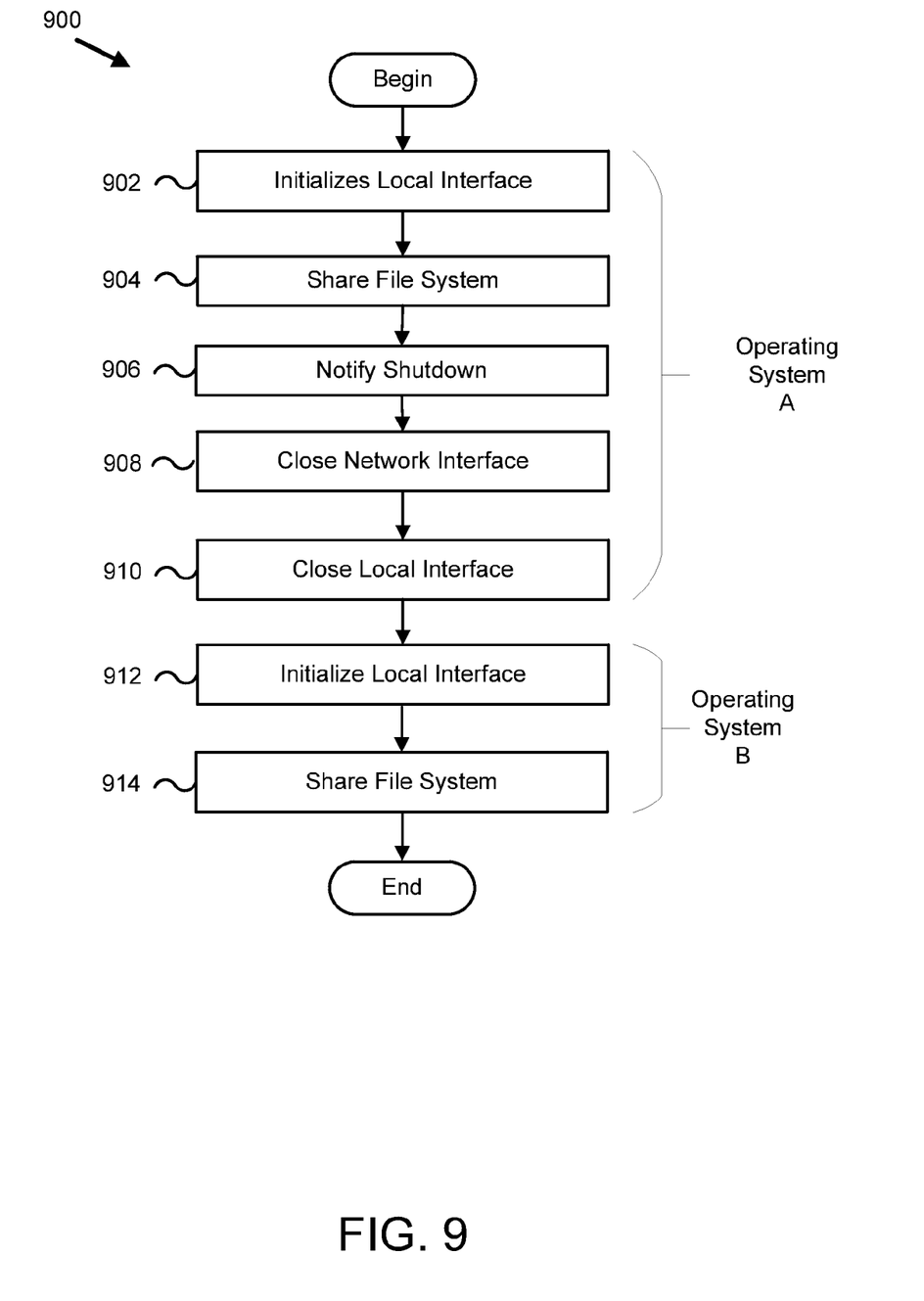
FIG. 9 is a schematic flow chart diagram illustrating one embodiment of a method for sharing a file system between multiple operating systems.

FIG. 9 is a schematic flow chart diagram illustrating one embodiment of a method 900 for sharing a file system between multiple operating systems. In one embodiment, the method may begin and an operating system A may initialize 902 a local interface to the file system. The operating system A may share 904 the file system to operating system B. The operating system A may notify 906 the detection module 140 that it is going to shut down. The operating system A may close 908 a network interface to the file system. The operating system A may close 910 the local interface to the file system. Operating system B may initialize 912 a local interface to the file system. Operating system B may then share 914 the file system to other operating systems and the method 900 may end.

In other embodiments, as one skilled in the art may appreciate, many more operating system may share a local interface to a file system. In one embodiment, an operating system may close a local interface to the file system, the system may disconnect the operating system and physically connect another operating system to the file system. This may allow the other file system to initialize the local interface to the file system.

Figure 10:
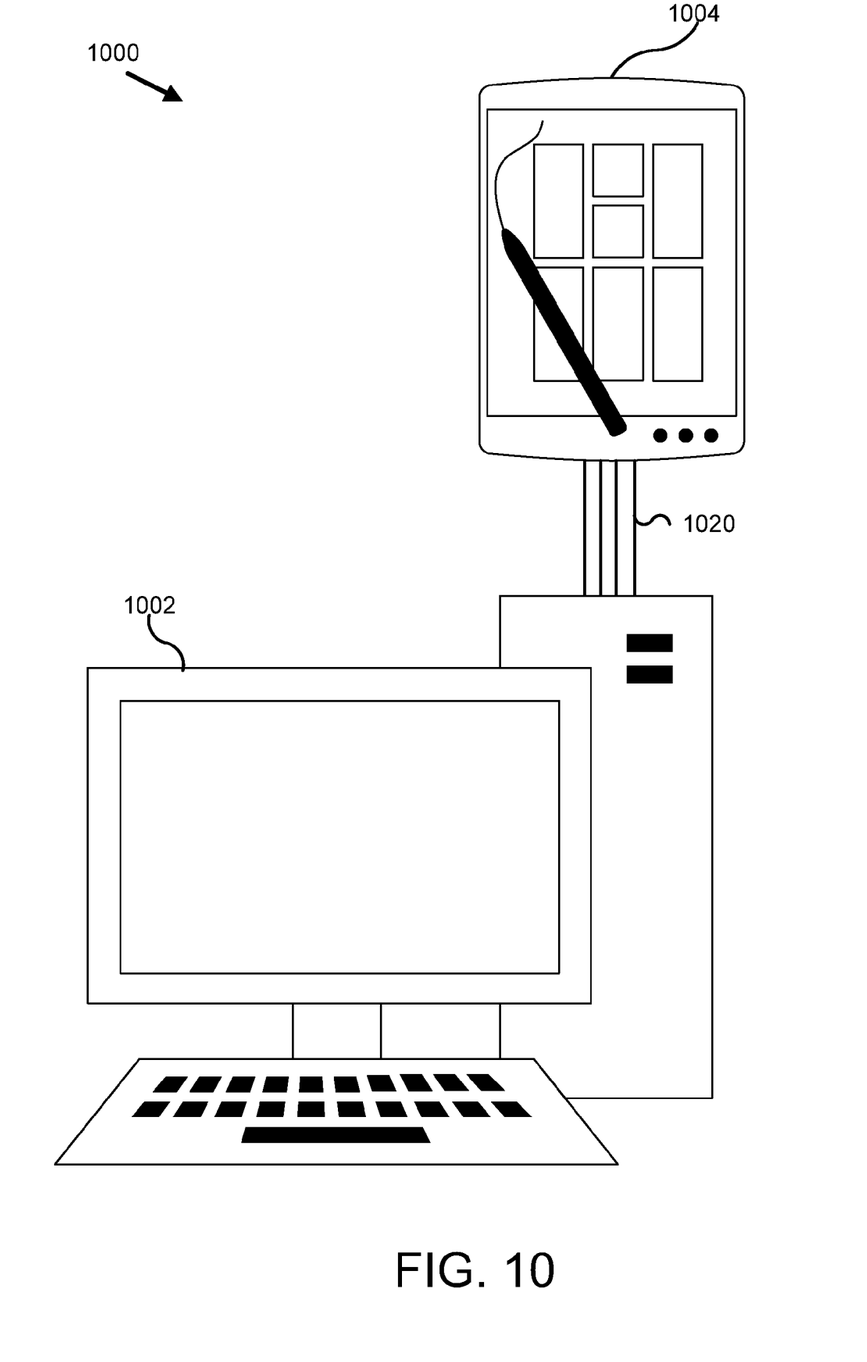
FIG. 10 is an illustration depicting one embodiment of a system for sharing a file system between multiple operating systems.

FIG. 10 is an illustration depicting one embodiment of a system 1000 for sharing a file system between multiple operating systems. In one embodiment, the system may include a personal computing device 1002 and a mobile computing device 1004.

In one embodiment, the personal computing device 1002 may include a computing device at a fixed location and may include a physical keyboard, a display, or the like. In another embodiment, the mobile computing device 1004 may include a laptop computer, a tablet computer, a cellular device, a smart phone, or the like. The mobile computing device 1004 may be designed to operate at various locations.

In one embodiment, the personal computing device 1002 may include a local interface to a storage device and file system. The personal computing device 1002 may operating independent of the mobile computing device. The mobile computing device 1004 may operate independently of the personal computing device.

In one embodiment, the system 1000 may include a connection point 1020 for the mobile computing device. In one example, a user may attach the mobile computing device 1004 to the personal computing device 1002. A detection module 140 may determine that the mobile computing device has an increased need to use the file system. The interface module 160 may disable the local interface for the personal computing device 1002 and initialize the local interface for the mobile computing device through the connection point 1020. The mobile computing device 1004 may then share the file system to the personal computing device 1002. In this example, the personal computing device 1002 may not recognize that the interface had changed from the local interface to a network interface, or the like.

In another embodiment, a first operating system may notify another operating system to take the local interface to the file system. In response to such a notification, a detection module 140 may determine that the other operating system has the altered need for the file system. The altered need may be based on the current operating system no longer having a local interface and the other operating system need to take the local interface so that other operating systems may access the file system through a network interface from the operating system that has the local interface.

In another embodiment, the personal computer 1002 may not include a display. In this embodiment, a user may connect the mobile device 1004 to the base of the personal computing device 1002. The detection module 140 may detect the connection and may switch a local interface to the file system to the mobile computing device 1004. Furthermore, the personal computing device 1002 may display to the display of the mobile computing device 1004. Therefore, the mobile computing device 1004 when connected to the base of the personal computing device 1002 may provide an interface to the personal computing device 1002. When disconnected from the personal computing device 1002, the mobile computing device 1004 may display the operating system operating executing on the mobile computing device 1004.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor, the code comprising:
      code that determines an altered need for a file system that is shared on two or more operating systems, the two or more operating systems operating concurrently on a computing device, wherein a first operating system of the two or more operating systems accesses the file system using a local interface and shares the file system using a first network server of a network interface, and a second operating system of the two or more operating systems accesses the file system using a first network client of the network interface; and
      code that causes the second operating system to access the file system using the local interface and to share the file system using a second network server of the network interface, and causes the first operating system to access the file system using a second network client of the network interface based on the altered need.

2. The apparatus of claim 1, further comprising code that monitors power states for the two or more operating systems, wherein the altered need is based on a power state change for one of the two or more operating systems.

3. The apparatus of claim 2, wherein power states for at least two of the two or more operating systems are selected from the group consisting of
   the two operating systems being in an active power state, and
   one of the at least two operating systems being in an active power state and another of the at least two operating systems being in a sleep mode power state, the power state change comprising the first operating system entering the sleep mode power state.

4. The apparatus of claim 1, further comprising code that measures a demand for the file system, wherein the altered need is based on the demand.

5. The apparatus of claim 1, further comprising code that suspends operations for the file system.

6. The apparatus of claim 1, wherein the two or more operating systems operate on different processors.

7. The apparatus of claim 1, wherein the code causes the second operating system to access the file system using the local interface by switching a mechanical switch to disconnect the first operating system from the file system and connect the second operating system to the file system.

8. A method comprising:
   sharing a file system between two distinct operating systems, the two distinct operating systems concurrently operating on a computing device, wherein a first operating system of the two distinct operating systems accesses the file system using a local interface and shares the file system using a first network server of a network interface, and a second operating system of the two distinct operating systems accesses the file system using a first network client of the network interface;
   determining, by use of a processor, that one of the two distinct operating systems has an altered need for the file system; and
   causing the second operating system to access the file system using the local interface and to share the file system using a second network server of the network interface, and causing the first operating system to access the file system using a second network client of the network interface based on the altered need.

9. The method of claim 8, wherein power states for the two distinct operating systems are selected from the group consisting of:
   the two distinct operating systems being in an active power state, and
   one of the two distinct operating systems being in an active power state and another of the two distinct operating systems being in a sleep mode power state, the altered need based on the first operating system entering the sleep mode power state.

10. The method of claim 8, further comprising suspending operations to the file system during causing the second operating system to access the file system.

11. The method of claim 8, wherein the two distinct operating systems operate on different processors.

12. The method of claim 8, wherein the altered need comprises detecting an increased need to use the file system by the second operating system.

13. The method of claim 8, wherein causing the second operating system to access the file system comprises:
   shutting down the first operating system;
   taking down interfaces to the file system; and
   initiating the local interface to the file system for the second operating system.

14. A system comprising:
   a storage device storing a file system;
   a first operating system in communication with the storage device;
   a second operating system in communication with the storage device;
   a file system module that shares a local interface to the file system between the first operating system and the second operating system, wherein the first operating system accesses the file system using the local interface and shares the file system using a first network server of a network interface, and the second operating system accesses the file system using a first network client of the network interface;
   a detection module that determines an altered need for the file system on one of the first and the second operating systems; and
   an interface module that causes the second operating system to access the file system using the local interface and to share the file system using a second network server of the network interface, and causes the first operating system to access the file system using a second network client of the network interface based on the altered need.

15. The system of claim 14, further comprising a power state module that monitors power states for the first and the second operating systems, the detection module determining the altered need based on a power state change for one of the first and second operating systems.

16. The system of claim 14, further comprising a demand module that measures a demand for the file system, the demand from one of the first and the second operating systems, the detection module determining the altered need based on the demand.

17. The system of claim 16, wherein the demand module measures an increased demand for the file system on the second operating system, and the interface module causes the second operating system to access the file system using the local interface in response to the demand module measuring the increased demand.

18. The system of claim 14, further comprising an error module that monitors the first and second operating system for errors, the altered need based on the errors.

19. The system of claim 14, further comprising an operations module that suspends operations on the file system based on the interface module causing the second operating system to access the file system.

20. The system of claim 14, wherein the interface module causes the second operating system to access the file system using the local interface by switching a mechanical switch to disconnect the first operating system from the file system and connect the second operating system to the file system.

21. The system of claim 14, wherein the interface module causes the second operating system to access the file system using the local interface based on one of the first and second operating systems being powered down.

* * * * *